US008110636B1

(12) United States Patent
Fujimoto et al.

(10) Patent No.: US 8,110,636 B1
(45) Date of Patent: Feb. 7, 2012

(54) MULTI-BLOCK SULFONATED POLY(PHENYLENE) COPOLYMER PROTON EXCHANGE MEMBRANES

(75) Inventors: Cy H. Fujimoto, Albuquerque, NM (US); Michael Hibbs, Albuquerque, NM (US); Andrea Ambrosini, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 460 days.

(21) Appl. No.: 12/425,413

(22) Filed: Apr. 17, 2009

(51) Int. Cl.
*C08F 8/36* (2006.01)
*C08G 61/10* (2006.01)
*C08G 61/12* (2006.01)

(52) U.S. Cl. ........ 525/471; 525/534; 525/535; 528/125; 528/128; 528/220; 528/482; 528/487

(58) Field of Classification Search .................. 525/471, 525/534, 535; 528/125, 128, 220, 482, 487
See application file for complete search history.

(56) References Cited

U.S. PATENT DOCUMENTS

| | | | |
|---|---|---|---|
| 5,403,675 A | 4/1995 | Ogata et al. | |
| 6,590,067 B2 | 7/2003 | Kerres et al. | |
| 6,716,548 B1 | 4/2004 | Kaliaguine et al. | |
| 6,977,122 B2 * | 12/2005 | Colombo et al. | 429/494 |
| 7,022,810 B1 | 4/2006 | Cornelius | |
| 7,094,490 B2 * | 8/2006 | Cao et al. | 429/493 |
| 7,301,002 B1 | 11/2007 | Cornelius et al. | |
| 7,772,344 B2 * | 8/2010 | Inabe | 526/333 |
| 7,888,397 B1 * | 2/2011 | Hibbs et al. | 521/27 |
| 7,947,800 B2 * | 5/2011 | Liu et al. | 528/125 |
| 2005/0065285 A1 * | 3/2005 | Buvat et al. | 525/100 |
| 2007/0292730 A1 * | 12/2007 | McGrath et al. | 429/33 |

OTHER PUBLICATIONS

Michael A. Ogliaruso, Michael G. Romanelli, & Ernest I. Becker, Chemistry of Cyclopentadienones, Chem Rev, 1965, 65 (3), 261-367 DOI: 10.1021/cr60235a001 Publication Date (web) May 1, 2002.
Michael A. Hickner, Cy H. Fujimoto, Chris J. Cornelius, Transport in Sulfonated Poly(Phenylene)s: Proton Conductivity, Permeability, and the State of Water, 0032-3861/$—see front matter c 2006 Published by Elsevier Ltd. Doi: 10.1016/j.polymer.2006.02.034.
Boris Mahltig & Manfred Stamm, Adsorption and Structure Formation of Semi-Rigid Polyelectrolytes, Acta Chim. Slov. 2005, 52, 404-407.
L.W. Shacklette, H. Eckhardt, R.R. Chance, G.G. Miller, D.M. Ivory & R. H. Baughman, Solid-State Synthesis of Highly Conducting Polyphenylene from Crystalline Oligomers, j. chem.. Phys. 73(8), Oct. 15, 1980, 1980 American Institute of Physics.
Cy H. Fujimoto, Michael A. Hickner, Christopher J. Cornelius & Douglas A. Loy, Ionomeric Poly(phenylene) Prepared by Diels-Alder Polymerization: Synthesis and Physical Properties of a Novel Polyelectrolyte, 2005 American Chemic Society, Published on Web May 12, 2005.

* cited by examiner

*Primary Examiner* — Randy Gulakowski
*Assistant Examiner* — Mike M Dollinger
(74) *Attorney, Agent, or Firm* — Olivia J. Tsai

(57) ABSTRACT

Improved multi-block sulfonated poly(phenylene) copolymer compositions, methods of making the same, and their use as proton exchange membranes (PEM) in hydrogen fuel cells, direct methanol fuel cells, in electrode casting solutions and electrodes. The multi-block architecture has defined, controllable hydrophobic and hydrophilic segments. These improved membranes have better ion transport (proton conductivity) and water swelling properties.

21 Claims, 6 Drawing Sheets

Step 1

Step 3

Step 4

MULTI-BLOCK SULFONATED POLY(PHENYLENE) COPOLYMER PROTON EXCHANGE MEMBRANES

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention relates generally to sulfonated polymer compositions that are suitable for producing polymer electrolyte membranes, electrodes and membrane electrode assemblies for use in fuel cells, in electrolysis cells, in dialysis equipment and in ultrafiltration and methods of synthesizing polymer compositions. More specifically, the present invention relates to innovative multi-block sulfonated poly(phenylene) copolymers, methods of making the same, and their use as a proton exchange membrane (PEM) in hydrogen fuel cells, direct methanol fuel cell, and in electrode casting solutions and electrodes.

Polymer electrolyte fuel cells (PEFCs) have great potential as an environmentally friendly energy source. Fuel cells are electrochemical energy converters which feature in particular a high level of efficiency. Among the various types of fuel cells, PEFCs feature high power density and a low weight to power ratio. The PEFC uses as its electrolyte a polymer membrane.

Fuel cells are electrochemical cells in which a free energy change resulting from a fuel oxidation reaction is converted into electrical energy. Fuel cells are attractive electrical power sources, due to their higher energy efficiency and environmental compatibility compared to the internal combustion engine. The most well-known fuel cells are those using a gaseous fuel (such as hydrogen) with a gaseous oxidant (usually pure oxygen or atmospheric oxygen), and those fuel cells using direct feed organic fuels such as methanol.

The polymer electrolyte membrane or proton exchange membrane (PEM) is an important aspect of any PEFC. PEMs are excellent conductors of hydrogen ions. The most widely used materials to date consist of a fluorocarbon polymer backbone, similar to Teflon®, to which are attached sulfonic acid groups. The acid molecules are fixed to the polymer and cannot "leak" out, but the protons associated with these acid groups are free to migrate through the membrane in the presence of water. With the solid polymer electrolyte, electrolyte loss is not an issue with regard to stack life. The potential power generated by a fuel cell stack depends on the number and size of the individual fuel cells that comprise the stack, and the surface area of the PEM.

In many fuel cells, the anode and/or cathode comprise a layer of electrically conductive, catalytically active particles (usually in a polymeric binder). A polymer electrolyte membrane is sandwiched between an anode and cathode, and the three components are sealed together to produce a single membrane electrode assembly (MEA). The anode and cathode are prepared by applying a small amount of a catalyst, for example, platinum (Pt) or ruthenium-platinum (Ru/Pt), in a polymeric binder to a surface that will be in contact with the PEM. Preparation of catalyst electrodes has traditionally been achieved by preparing an ink consisting of an electrocatalyst (either Pt or Ru/Pt) and Nafion® polymer (5% wt. solution dispersed in lower alcohol). The ink is applied to porous carbon paper using a painting technique, or directly depositing the ink upon the membrane surface, or pressing it onto the membrane like a decal.

A MEA of a hydrogen fuel cell typically accepts hydrogen from a fuel gas stream that is consumed at the anode, yielding electrons to the anode and producing hydrogen ions (protons), which enter the electrolyte. The polymer electrolyte membrane allows only the hydrogen ions to pass through it to the cathode while the electrons must travel along an external circuit to the cathode thereby creating an electrical current. At the cathode, oxygen is reduced by the electrons from the cathode and reacts with the hydrogen ions from the electrolyte to produce water. The water does not dissolve in the electrolyte and is, instead, rejected from the back of the cathode into the oxidant gas stream.

For the last 30 years the industry standard for the PEM component of a hydrogen or methanol fuel cell has been membranes based on fluorine-containing polymers, for example, the Nafion® material marketed by DuPont. Nafion® is a perfluorinated sulfonic acid polymer having a well-known structure. Nafion® is often used as a membrane material for fuel cells that operate at temperatures close to ambient. Further, Nafion® polymer membranes are hydrated and they have a proton conductivity of about $10^{-2}$ S/cm or higher.

The Nafion® membranes display adequate proton conductivity, chemical resistance, and mechanical strength. Some of the membrane's disadvantages are low hydrated glass transition temperature high methanol permeability in direct methanol fuel cells, humidity dependence on proton conductivity, and cost.

The low hydrated glass transition temperature of Nafion® membranes may cause them to creep in a working fuel cell when hydrated above 80° C. Creep may perturb contact between the membranes with the electrode or gas diffusion layers, and may also lead to pin hole defects. Additionally, there is a need to reduce the costs associated with such membranes.

Another limitation of Nafion® membranes occurs in applications in methanol fuel cells as Nafion® membranes are permeable to methanol. Methanol crossover is inversely proportional to membrane thickness. Direct transport of the fuel (i.e. methanol) across the membrane to the cathode results in losses in efficiency. Increasing the membrane thickness results in decreased methanol crossover. However, thicker membranes result in increased Ohmic losses and decreased fuel cell performance.

Membranes that lowered the rate of methanol crossover would allow the use of higher concentrations of methanol-water feed mixtures, which would increase catalyst efficiency, direct methanol fuel cell power output, and potentially fuel utilization.

In general, increasing the operation temperature of fuel cells is advantageous for several reasons. Higher operating temperatures in methanol fuel cells decrease the carbon monoxide poisoning of the electrocatalyst. Higher temperatures increase reaction kinetics of hydrogen oxidation on the anode and oxygen reduction on the cathode. However, as the temperature is increased, it becomes more difficult to keep the membrane hydrated. Dehydration of membranes is exacerbated by relatively thick membranes. Dehydrated membranes lose ionic conductivity and result in poor contact between fuel cell components due to shrinkage of the membrane. Therefore, improved performance of fuel cells could be achieved by reducing the thickness of the membranes, and improving the humidification state of solid PEMs, since water molecules can promote proton transport and thin membranes can reduce ionic resistance and Ohmic losses.

Additionally, the contact between the membrane and electrode affects the efficiency of a fuel cell. Interfacial resistance between the membrane and electrode causes Ohmic loss thereby decreasing fuel cell efficiency. Improving the membrane-electrode contact and continuity, wherein the membrane and electrode are cast from a composition having the same or similar polymer electrolytes, would improve the membrane-electrode interfacial resistance.

What is needed are compositions from which improved polymer electrolyte membranes, electrodes, and electrode casting solutions can be made that have improved performance at temperatures at about 80° C. and above, and preferably above 120° C. Operating at these temperatures would result in enhanced diffusion rates and reaction kinetics for methanol oxidation, oxygen reduction, and CO desorption thereby producing a more efficient fuel cell.

Novel sulfonated PEM membranes have been previously synthesized at Sandia National Laboratories (SNL) for the DOE fuel cell program, and later patented (U.S. Pat. No. 7,301,002, which is incorporated herein by reference). These previous PEM materials were composed of a sulfonated poly (phenylene) compound that was prepared by a Diels-Alder reaction; and which will hereafter be referred to by the acronym SDAPP.

Scheme 1 shows an example of the synthesis of a SDAPP polymer.

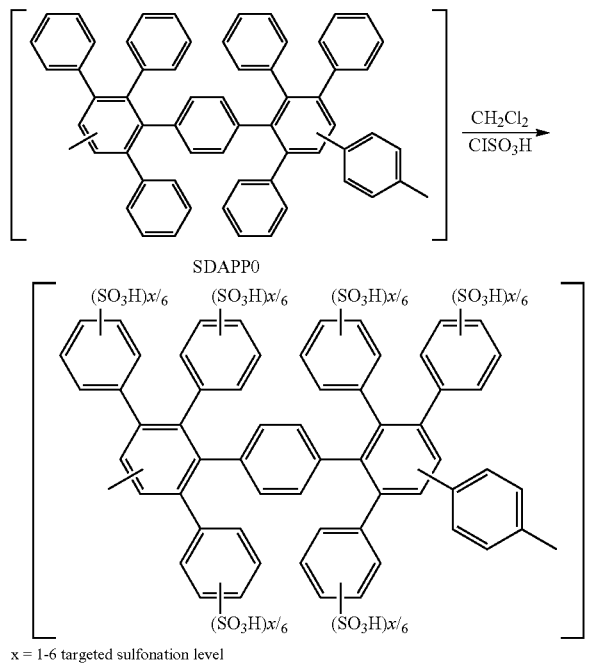

x = 1-6 targeted sulfonation level

The polymerization reaction to make the unsulfonated parent polymer is an irreversible Diels-Alder reaction that is responsible for forming every other phenyl ring in the backbone. Due to the ambiguous regiochemistry of the reaction, a mixture of 1,4 and 1,3-substituted rings are formed. The parent polymer is then treated with a sulfonating agent (e.g., $ClSO_3H$) to attach sulfonic acid groups on the para-positions of some of the pendant phenyl rings in Scheme 1. The number of sulfonic acid groups formed can vary from x=1-6, and thus the ion exchange capacity (IEC) can be controlled by varying the amount of sulfonating agent used.

The previous synthesis method, diagrammed in Scheme 1, is based on post-modification of a specific family of poly (phenylenes). However, there are several disadvantages to this method, including:

The position of acid groups on the backbone cannot be controlled;

Tailored morphologies, or block and graft architectures, cannot be generated; and The chemical similarity of the aryl groups prevents spectroscopic determination of the segment length, which presents a barrier to nano-controlled morphology.

What is needed, then, are improved synthesis techniques that enhance the microscopic self-assembly of differing hydrophobicity/hydropholicity phases in ion containing polymers. Control and self-assembly of hydrophilic domains in the polymer can lead to more efficient mobility of protons through the membrane, improving ionic conductivity.

SUMMARY OF THE INVENTION

The present invention relates to multi-block sulfonated poly(phenylene) copolymer compositions, methods of making the same, and their use as proton exchange membranes (PEM) in hydrogen fuel cells, direct methanol fuel cells, in electrode casting solutions and electrodes. The multi-block architecture has defined, controllable hydrophobic and hydrophilic segments. These improved membranes have better ionic transport (proton conductivity) and water swelling properties.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Figure 1:
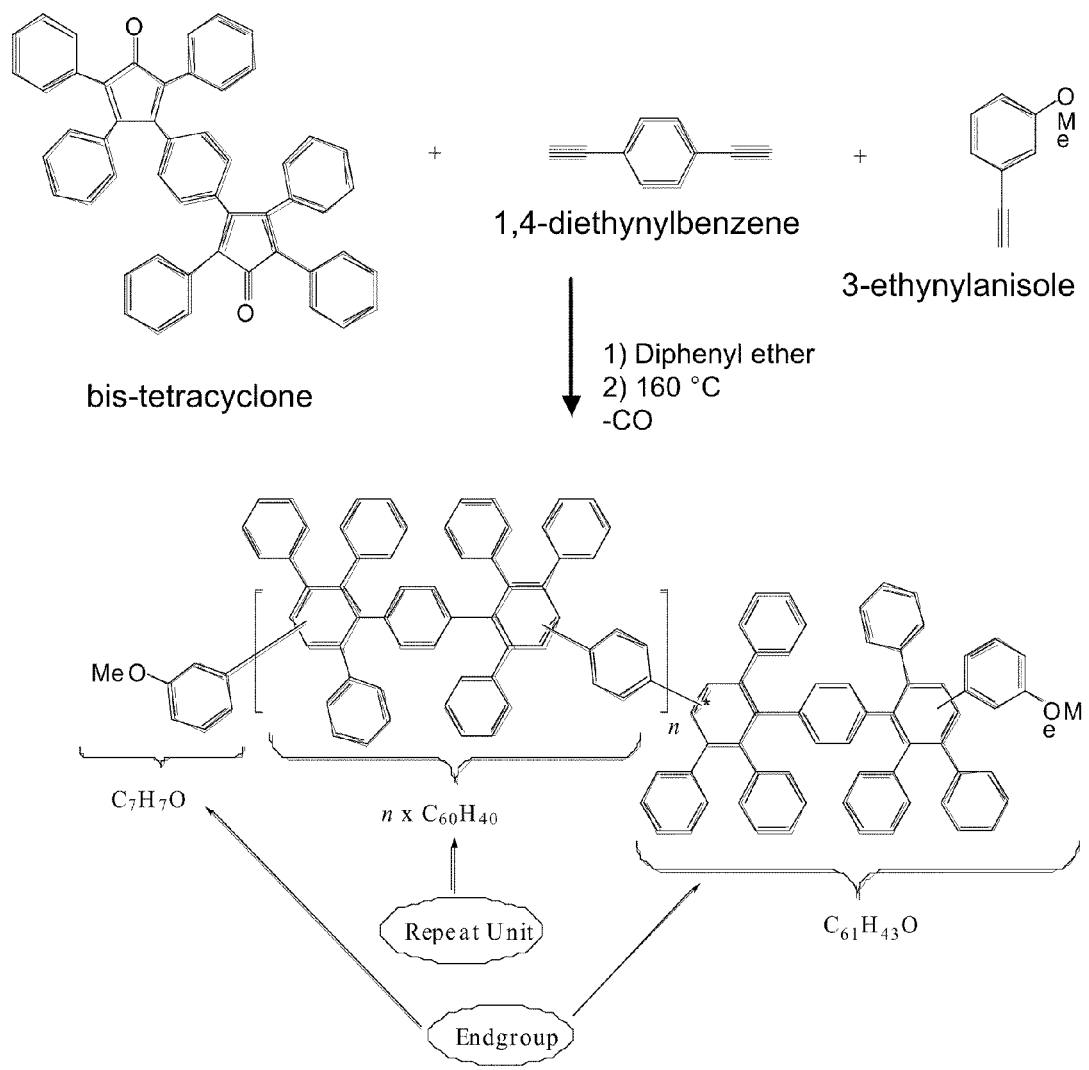
FIG. 1 shows the first step of the synthesis process.

For ease of explanation, the present invention is explained in terms of Diels Alder poly(phenylene) polymer compositions (DAPP), sulfonated Diels Alder poly(phenylene) polymer compositions (SDAPP), and multi-block sulfonated Diels Alder poly(phenylene) polymer compositions (MB-SDAPP).

Structure I shows a basic DAPP composition polymerized to form poly(phenylene) polymer, which can be between, for example, about 10-300 repeat units. Structure I is synthesized by various methods, including Diels Alder reactions for example where 1,4-bis(2,4,5-triphenylcyclopetadienone) benzene [bis tetracyclone] reacts with p-bis(ethynyl)benzene to yield carbon monoxide and poly(phenylene). Alternatively poly(phenylene) and carbon dioxide are produced by the condensation of 2-pyrone with p-bis(ethynyl)benzene.

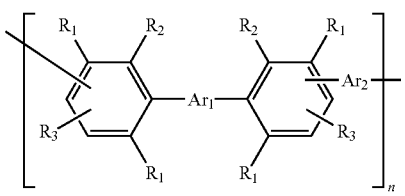

Structure I

The repeat unit contains $R_1$, $R_2$ and $R_3$, which can be the same or different entities, wherein each $R_1$, $R_2$ and $R_3$ is H or an unsubstituted or inertly-substituted aromatic moiety. $Ar_1$ represents an unsubstituted or inertly substituted aromatic moiety; $Ar_2$ represents an unsubstituted or inertly substituted aromatic moiety. Aromatic moiety includes phenyl polyaromatic and fused aromatic moieties that can be unsubstituted or inertly-substituted and include:

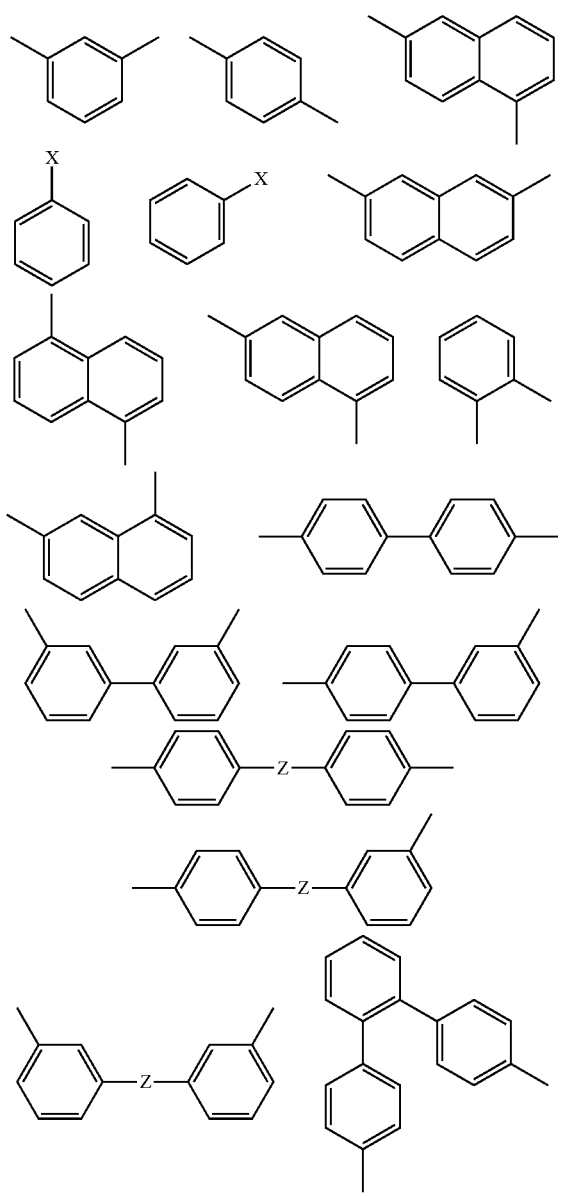

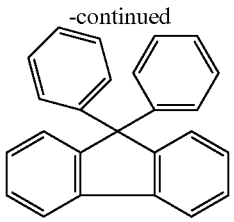

Each Z is selected from —O—, —S—, alkylene, —CF$_2$—, —CH$_2$—, —O—CF$_2$—, perfluoroalkyl, perfluoroalkoxy,

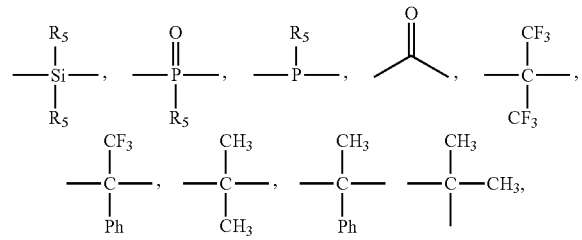

where $R_5$ may be —H, CH$_3$, —CH$_2$CH$_3$, —(CH$_2$)CH$_3$ or Ph, (where Ph is phenyl). Substituent groups that do not react under Diels Alder polymerization conditions and under casting film conditions define inert substitution. Functional groups include but are not restricted to x=CH$_3$, CEt$_3$, CCH$_3$, CF$_3$, NMe$_2$, NH$_2$, F, Cl, Br, OCH$_3$, OH, OCF$_3$, O—Ph, Ph, and SO$_3$R$_5$.

Synthesis of DAPPs can be performed using a modification of the method known in the art wherein to bis-tetracyclone (50.0 g; 72.4 mmol) and 1,4-diethynylbenzene (9.13 g; 72.4 mmol) in a 500 mL Schlenk flask is added diphenyl ether (250 mL) and the resulting mixture is frozen in an ice bath. The mixture is freeze-thaw degassed (3×) before heating under argon (1 atm) at 180° C. for 24 h. Periodically, carbon monoxide is vented to avoid over-pressurization of the reaction flask. Subsequently, additional diethynylbenzene (0.10 g; 0.8 mmol) is added to the viscous slurry and the mixture is stirred for an additional 12 h at 180° C. The reaction vessel is then cooled to room temperature and its contents are diluted with toluene (300 mL). The polymer is precipitated by dropwise addition of the solution to 1000 mL of acetone. This dilution in toluene and precipitation in acetone is repeated and the resultant white solid is dried in a vacuum oven for 12 h at 80° C., 48 h at 230° C., and 24 h at room temperature. A 96% yield (52 g collected) of a tough, yellow solid is obtained. In one embodiment, the DAPP polymer is polymerized in the absence of a metal catalyst.

In one example of sulfonation, a DAPP (7.02 g) is added to a flame dried, 500 mL three-neck, round-bottom flask under argon and dissolved in methylene chloride (6% solution by weight). The solution is cooled to −50° C. (dry ice/acetonitrile) and chlorosulfonic acid (4.30 g, 36.9 mmol, diluted in 20 mL chloroform) is added dropwise though an addition funnel over 15 minutes while being vigorously stirred with a mechanical stirrer under an argon atmosphere. This amount of chlorosulfonic acid (ClSO$_3$H) gives a 4:1 ratio of acid to polymer repeat unit. Other ratios of sulfonating agent to polymer repeat unit can be used to attain polymers with various ion exchange capacities. The mixture darkened from bright yellow to black during chlorosulfonic acid addition. After 30 minutes the reaction is warmed to room temperature at which point a dark solid precipitated. The organic solvent was decanted and to the remaining solid was added 300 mL of a 0.5 M solution of NaOH that was allowed to react at room temperature for 12 h. The slurry is then heated for 4 h at 80° C. to ensure sulfonyl chloride conversion. The off-white solid was Soxhlet extracted with de-ionized water for 48 h and dried in a vacuum oven at 100° C. for 48 h to obtain light yellow solid (9.52 g). $_1$H NMR (d-DMSO): δ (ppm)=broad signal 6.35-7.22 (peaks at 7.19, 7.09, 6.95, 6.88, 6.64, 6.54). $_{13}$C NMR (DMSO-d$_6$): δ (ppm)=broad signal 138-141 (peak at 139) broad signal 131-126 (peaks at 126.9, 128.7, 129.5, 131.0).

Examples of sulfonating agents include sulfuric acid, fuming sulfuric acid, sulfur trioxide, a mixture of sulfuric acid and thionyl chloride, chlorosulfonic acid, and trimethylsilyl chlorosulfonate (TMSCS).

A sodium salt of the sulfonated polymer can be dissolved in N,N-dimethylacetamide (DMAc, 10% weight solution) and filtered though a 2 um syringe filter (glass microfiber filter). The solution is cast onto a clean glass plate in an oven at 90° C. under N$_2$. After 20 h, the film is removed from the glass plate and immersed in de-ionized water (1 L, 18 M) for one hour at 100° C. to extract any residual DMAc. The resultant film is then converted into the acid (proton) form by immersion in 2.0 M H$_2$SO$_4$ at 100° C. for one hour. The film is rinsed thoroughly with de-ionized water and then soaked in deionized water (18 M) at 100° C. for another hour to remove any residual acid. The films are stored in de-ionized water until used.

Activation of the poly(phenylene)(s) for proton conductivity is accomplished by using a variety of activating agents. The degree of sulfonation and the homogeneity of sulfonation between repeat units are controlled by varying the concentration of the sulfonating agent, varying the temperature of the reaction and whether a poly(phenylene) polymer is dissolved at the time of sulfonation. Pendant side chains of sulfonyl groups are attached to a carbon atom of the lateral phenyl ring. Attachment of the pendant groups to the backbone can be at the par-a or meta-positions.

The sulfonating agent can be added to solid polyphenylene polymer. The ratio of acid to polymer repeat unit is varied to yield polymers with various ion exchange capacities. Examples of sulfonating agents include sulfuric acid, fuming sulfuric acid, and sulfur trioxide but are not limited thereto. Use of this method can result in inhomogeneous sulfonation since only the surface of the solid polymer is in contact with the sulfonating agent. Alternatively, sulfonation can proceed by dissolving the polymer in a chlorinated hydrocarbon, followed by the addition of the sulfonating agent. Conversely, sulfonation can be performed by adding the polymer solution to the sulfonating agent, either neat or mixed with a chlorinated hydrocarbon. This results in sulfonation that occurs homogenously through the polymer backbone since each repeat group has an equal probability of reacting with the sulfonating agent. Chlorosulfonic acid sulfonation at elevated temperatures results in a homogenous sulfonation of each polymer unit. Varying the concentration of the sulfonating agent varies the degree of sulfonic acid pendant groups per polymer repeat unit.

Poly(phenylenes) that are not 100% sulfonated are soluble in a variety of polar, aprotic solvents such as N,N-Dimethylacetamide (DMAc), dimethylformamide (DMF), dimethylsulfoxide (DMSO) and N-Methylpyrrolidone (NMP). Fully sulfonated polyphenylenes are at least partially insoluble in a variety of polar, aprotic solvents such as DMAC, DMF, DMSO and NMP and as such can form a hydrogel. The sulfonated polyphenylene hydrogels are useful as ion exchange resins for desalination of water and chelation of inorganic materials that can exchange into the hydrogel.

The degree of sulfonation per repeat polymer unit is controlled by the concentration of the sulfonating agent. Manipulation of temperature and concentration of the sulfonating agent yield sulfonated polyphenylene polymer compositions having morphology that allows for increased ion exchange capacity, membrane hydration, improved physical properties at temperatures above 80° C. and limited methanol (MeOH) fuel crossover when compared to Nafion® compositions.

Alternatively, the membranes can be sulfonated in the solid state by immersing in a solution of TMSCS in dichloromethane. A useful range of concentrations of TMSCS in dichloromethane is 0.25 to 1.5 weight percent. Other useful solvents can be used in place of dichloromethane, for example chloroform, carbon tetrachloride, chlorobenzene, or 1,1,2,2-tetrachloroethane.

The backbone structure of DAPP and SDAPP provides decreased segmental mobility thereby producing a relatively stiff backbone structure or rod-like structure. The sulfonic acid pendant groups are distributed throughout the polymer. The overall morphology of the SDAPP provides for a rod-like structure wherein the acid groups form proton channels. The rod-like structure of the DAPP and SDAPP contributes to the improved water retention properties of the materials, the decreased low-hydrocarbon fuel permeability and the improved conductance thereby leading to increased fuel cell efficiency over that of Nafion®117 materials.

According to one embodiment of the present invention films are cast upon a clean glass surface from about a 20 wt % solution of polymer. The surface of the glass can be coated with hydrophobic groups. The resulting film is transparent and flexible.

According to another embodiment of the present invention films are treated with H$_2$SO$_4$ for about 24 hours. The treated films are bathed in deionized water for about 24 hours to remove any inorganic salts. The treated films are further treated with H$_2$SO$_4$ at about 100° C. for about one hour. Inorganic salts deposited on the films are removed by bathing the films in deionized water at about 100° C. for about 1 hour. In an alternative embodiment the second wash step is omitted.

Electrochemical Impedance Spectroscopy (EIS) can be used to collect proton conductivity data for polyphenylene polymer materials and sulfonated polyphenylene polymer material. Films are measured by four probe EIS using a Solartron 1260 frequency analyzer and a Solartron 1287 potentiostat and a test cell designed to measure the materials impedance by the point method. The resistance of each film is measured while totally submerged in deionized-water during each measurement at 25° C. Proton conductivity was calculated using Eq. 1:

$$\sigma = d/(A \cdot R) \quad \text{Eq. 1}$$

where d is the electrode distance (0.5 cm), A is the cross sectional area of the film, and R is the film resistance. The conductivities are determined in hydrated films by AC impedance spectroscopy over a frequency range of $1\times10^3$ Hz to $1\times10^6$ Hz.

The multi-block sulfonated poly(phenylenes) of the present invention are also useful as battery separators, electrolytes for electrosynthesis cells, electrolytes for electrolysis cells, electrolytes for gas generating electrochemical systems, as ionic membranes in electrochemical sensors, as electrolytes in electrochemical scrubbers and other purification systems and as electrolytes in primary and secondary batteries.

Synthesis of Multi-Block Copolymers

The principle of constructing multi-block copolymers with highly-separated phases involves four sequential steps:
1. Synthesizing end-capped, controlled molecular weight oligomers of the Diels Alder poly(phenylene) DAPP with known repeat unit length=n (see FIG. 1);
2. Converting the end-capped (e.g., methoxy) groups to a reactive functional group, such as hydroxyl (see FIG. 2);
3. Linking two segments with controlled molecular weight and functional groups together to make a multi-block copolymer with n and m repeat units (see FIG. 3); and
4. Attaching acid groups onto only specific segments of the backbone (see FIG. 4).

Step 1. Synthesizing End-Capped, Controlled Molecular Weight Oligomers of the Diels Alder Poly(Phenylene), DAPP.

As shown in FIG. 1, reagents 1,4-bis(2,4,5-triphenylcyclopentadienone)-benzene and 1,4-diethynylbenzene are combined with an endcapping agent (e.g., 3-ethynylanisole) to make end-capped DAPP. Alternatively, in place of 3-ethynylanisole, other alcohol end-capping monomers can be used, such as 4-ethynylanisole, 2-ethynylanisole, ethynyl ethoxybenzene, ethynyl isopropoxybenzene, etc. The end-capping agent is used to generate NMR signatures, which is then cleaved in Step 2 with $BBr_3$ (although not as easily as the methoxy end-group).

End-capping allows the size (length) of the repeat unit, n, (i.e., molecular weight) to be controlled, in accordance with the Carothers Equation. The reaction in FIG. 1 is performed in the presence of diphenyl ether at 160° C.; and CO is evolved. In this new approach, we end-cap the Diels Alder poly(phenylene) with functional groups that have large, distinct NMR signatures that provide a convenient means of determining segment length, and also provide a reactive site for further chemistry. Since the oligomer is endcapped with methoxy groups (MeO), the size of the repeat unit, n, can be determined by end group analysis with H-NMR.

Alternatively, in place of alkoxide groups, such as methoxy, other reactive functional groups (e.g., fluorine) can be used as end caps, e.g., pentafluorobenzene or ethynyl tetrafluorobenzene. In this case, F-NMR is used to calculate segment length. This has an advantage over alkoxide groups since pentafluorobenzene or ethynyl tetrafluorobenzene is sufficiently reactive as is, and does not need to undergo any additional conversion chemistry (Step 2).

Step 2. Converting the End-Cap Groups to a Reactive Functional Group, Such as Hydroxyl.

Figure 2:
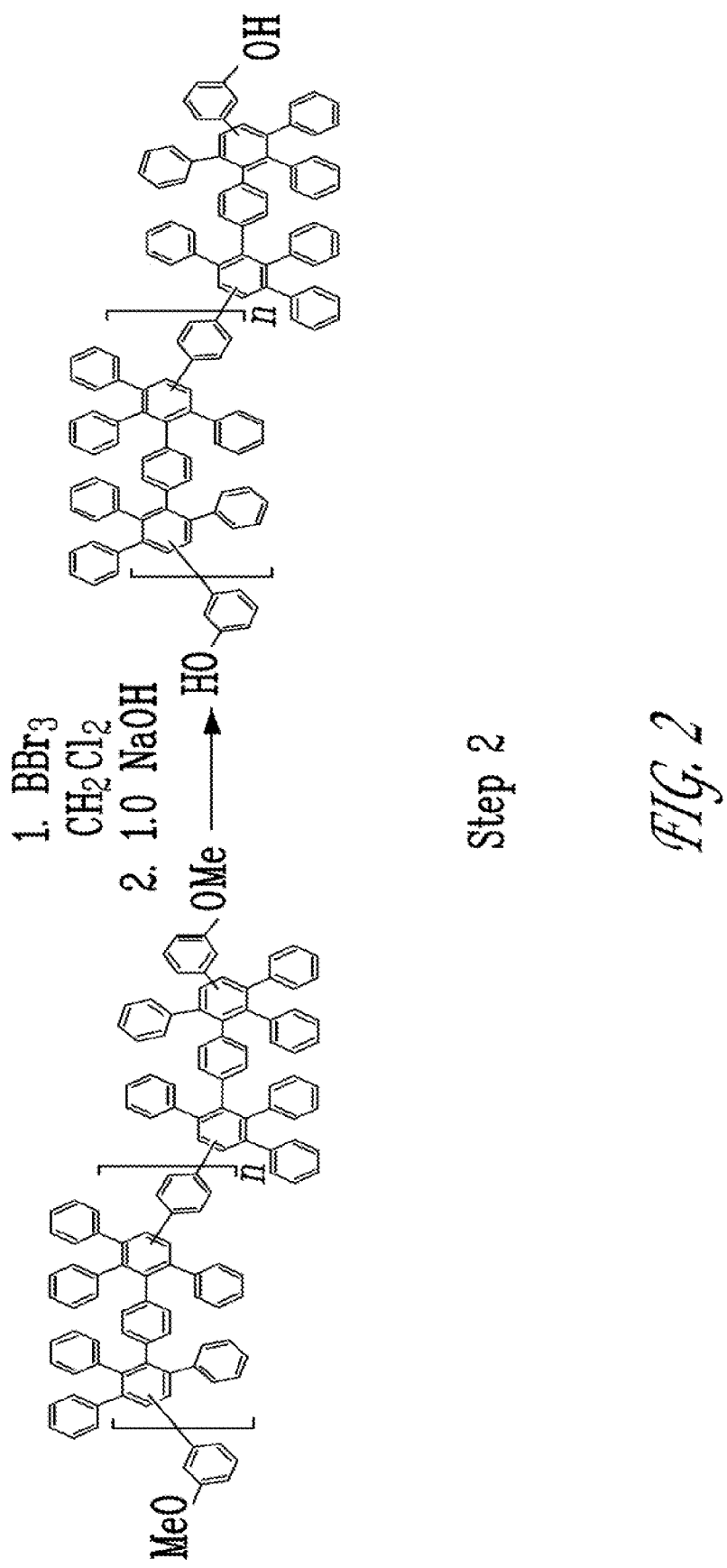
FIG. 2 shows the second step of the synthesis process.

After determination of the segment length by H-NMR, the methoxy group is converted to a reactive functional group, such as hydroxyl (OH), by reacting the end-capped DAPP with boron tribromide ($BBr_3$), as shown in FIG. 2. This reaction can take place in the presence of $CH_2Cl_2$ and then quenched with 1.0 M NaOH.

Step 3. Linking Two Segments with Controlled Molecular Weight and Functional Groups Together to Make a Multi-Block Copolymer with N and M Repeat Units.

Figure 3:
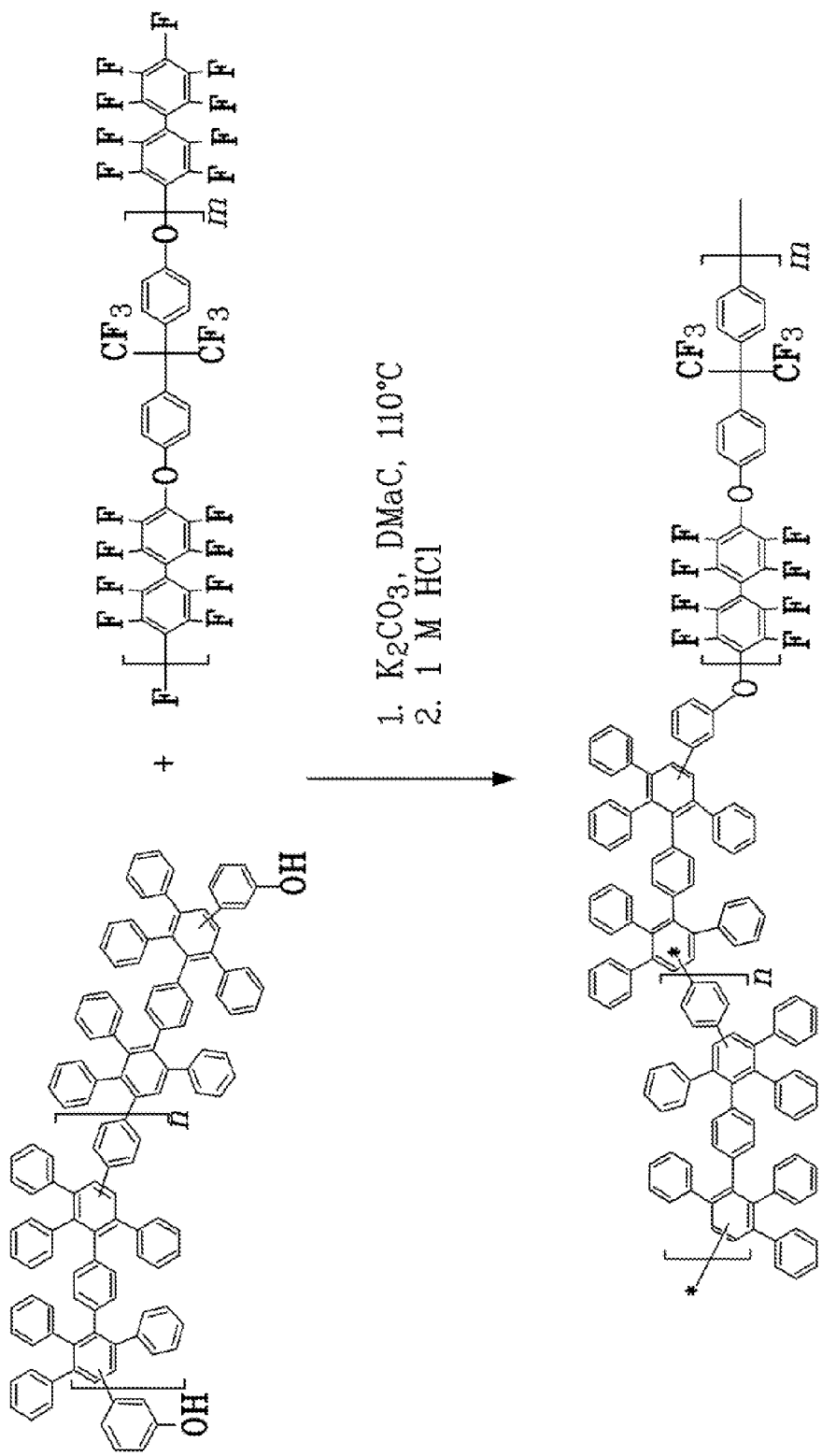
FIG. 3 shows the third step of the synthesis process.

Once the Diels Alder poly(phenylene) oligomer segment length, n, has been determined, and the polymer converted to a more reactive form (such as a hydroxyl), it can be linked to a different segmented defined polymer, as shown in FIG. 3. In this case, the second polymer can be a heavily fluorinated poly(arylene ether) polymer with reactive aryl-F bonds. However, other types of activated oligomers which have endgroups that are susceptible to nucleophilic aromatic substitution reactions can be utilized. Examples of such endgroups include p-halophenyl sulfones and p-halophenyl ketones. The reaction in FIG. 3 takes place in the presence of NMP (N-methylpyrrolidinone) and $K_2CO_3$, at an elevated temperature of 110 to 120° C. Alternatively, in place of NMP, other polar aprotic solvents can be used, such as: DMAc, dimethyl sulfoxide, or N,N-dimethylformamide. The resulting multi-block copolymer has n repeat units of the poly(phenylene), and m repeat units of the poly(ether). In one embodiment, the values of n or m can range from 1 to 50. In another embodiment, n can range from 1 to 300. In another embodiment, the ratio of n to m can range according to: $0.1\ m \leq n \leq 100\ m$.

Step 4. Attaching Acid Groups onto Only Specific Segments of the Backbone.

Figure 4:
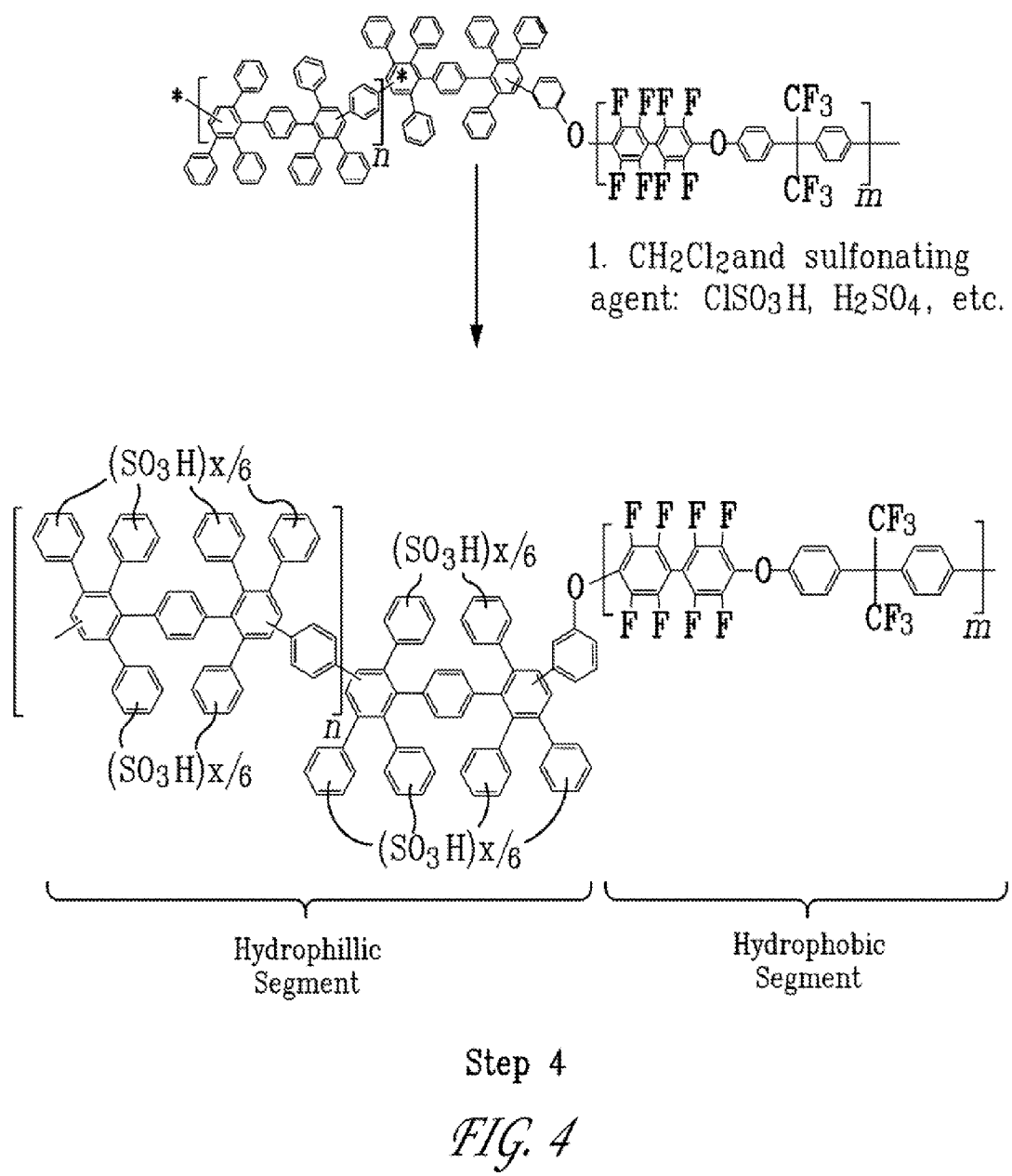
FIG. 4 shows the fourth step of the synthesis process.

Having controlled segments lengths of both the Diels Alder poly[phenylene] and fluorinated arylene ether, the multi-block copolymer can be functionalized with acid groups (i.e., sulfonated) by reacting with (but not limited to) chlorosulfonic acid, as shown in FIG. 4. Examples of sulfonating agents include sulfuric acid, fuming sulfuric acid, sulfur trioxide, a mixture of sulfuric acid and thionyl chloride, chlorosulfonic acid, and trimethylsilyl chlorosulfonate (TMSCS), as shown in FIG. 4. The electron withdrawing property of the fluorine atoms on the arylene ether segment make it non-reactive towards sulfonation, and, hence, only the Diels Alder poly[phenylene] segments are reacted. The number of sulfonic acid groups formed can vary from x=1-6, depending on the amount of sulfonating reagent used. For the present multi-block copolymers, the best properties are obtained by fully-sulfonating the DAPP segments, i.e., x=6. The poly(phenylene) segments (n) become hydrophilic when sulfonated. However, since the poly(ether) segments (m) can not be sulfonated, they remain hydrophobic. Thus the sulfonic acid groups are clustered along discreet segments of the copolymer backbone.

Using these methods of synthesis, both the hydrophilic and hydrophobic segments can be controlled and manipulated. This structural control also leads to control over the overall polymer morphology in membrane form, which may lead to better fuel cell membrane properties such as higher proton conductivity (>0.1 S/cm) at high temperatures (>120° C.) and low relative humidity (<25%). The resulting multi block co-polymer has defined acid-containing and non acid-containing segment lengths. This leads to the direct control of the hydrophilic and hydrophobic segments, which enables control of two important parameters in fuel cells; ion transport and water swelling. An example of a final structure is shown in Structure II:

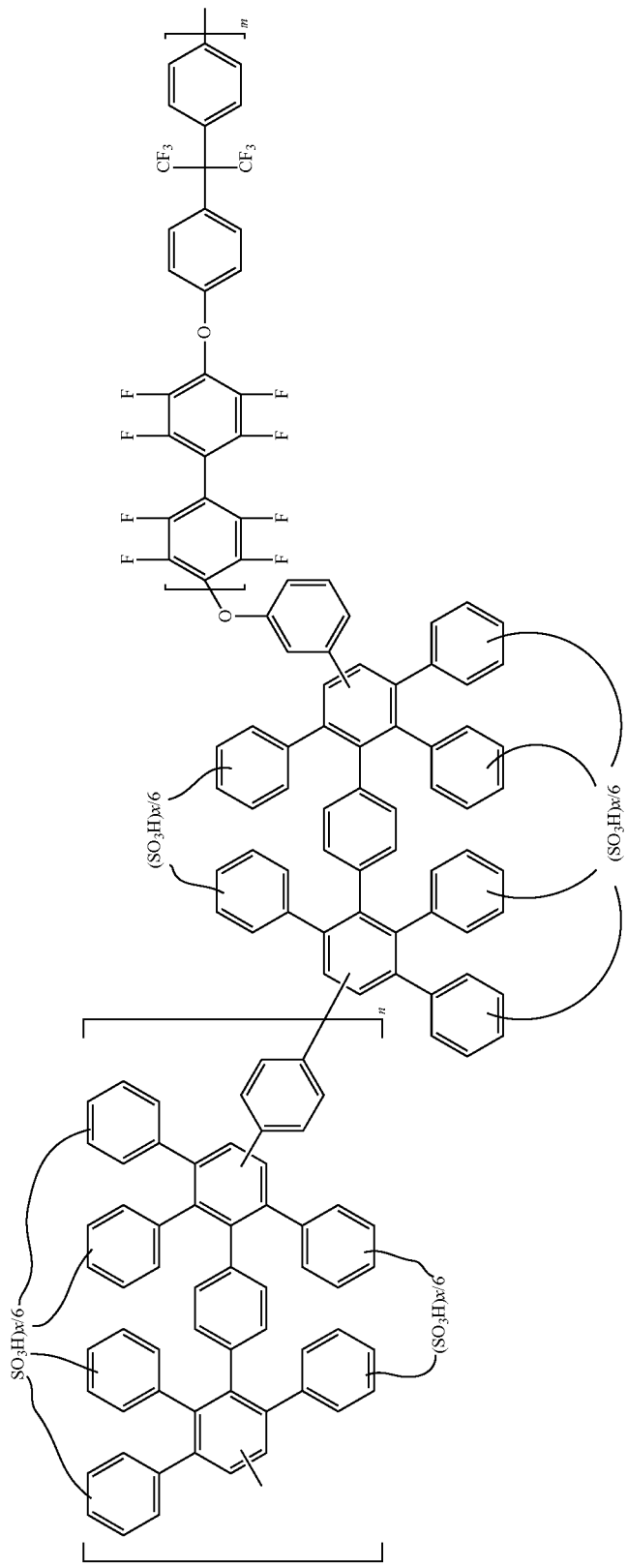

Figure 5:
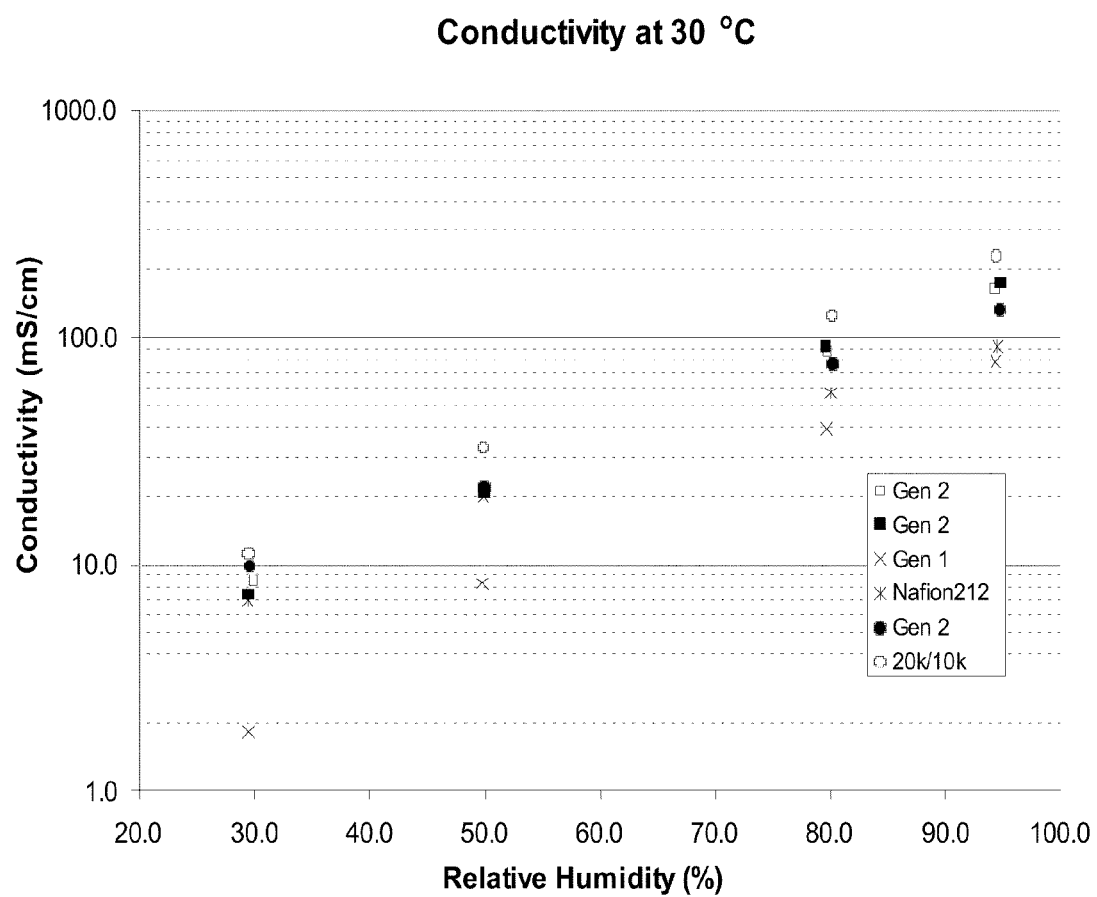
FIG. 5 shows a plot of conductivity versus relative humidity.

To date, the conductivity of these multi block co-polymers (Generation 2) have shown remarkable improvements over the randomly sulfonated Sandia materials (Generation 1). This can be seen in FIG. 5. With distinct control of the oligomer segment length, materials with proton conductivities orders of magnitude better in performance over the 1$^{st}$ generation can be developed.

Figure 6:
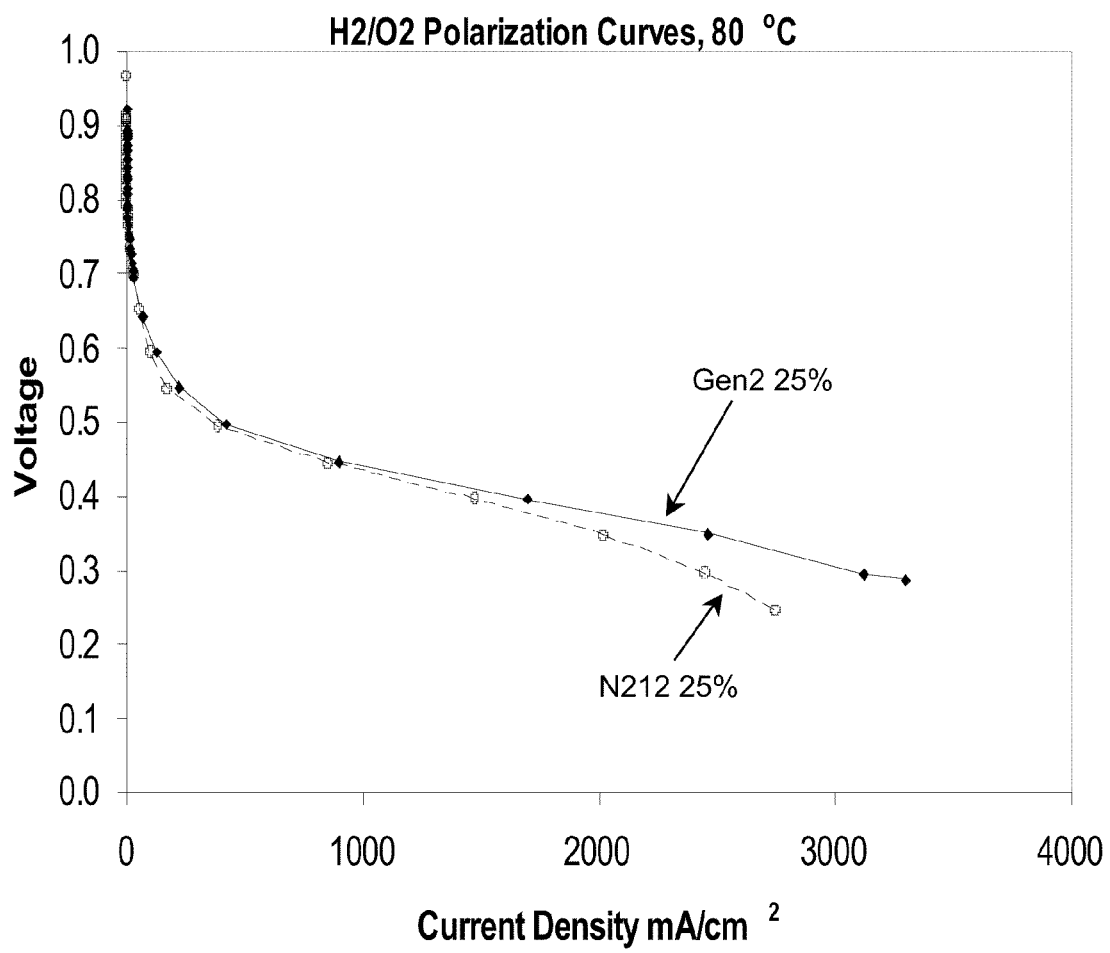
FIG. 6 shows a plot of voltage versus current density.

In FIG. 6, the fuel cell performance of Generation 2 material is compared against Nafion® 212 at various relative humidities. At high voltages the Generation 2 material performs better than Nafion® and at all relative humidities performs better than Generation 1.

Example 1

20 k Diels Alder Oligomer with Reactive Hydroxide End Group 10.671 g of bis(tetracyclone), 1.854 g of bis ethynyl benzene and 0.199 g of 3 ethynyl anisole was added in a 500 ml three neck flask. 250 ml of diphenyl ether was then added and the slurry was freeze pump thawed three times. The reaction was than heated to 175° C. for 14 hrs. After this time the reaction was cooled to 80° C. and precipitated in 1 L of acetone. The white solid was re dissolved in 100 ml of toluene and precipitated in 500 m of acetone. The solid was dried in a vacuum oven at 200° C. for 24 hrs, 11.4 g was collected with a Mn of 18 k by H-NMR. 10 g of the isolated product was dissolved in 150 ml of CH$_2$Cl$_2$ and 0.2 ml of BBr$_3$ was added and the solution turned immediately from a yellow to dark brown. The solution was stirred for 14 hrs after which the solution was slowly added to a stirring solution of 1.0M NaOH. The solid was then filtered and rinsed several times before it was dried in a vacuum oven for 24 hrs.

Preparation of a Block Co-Polymer with Diels Alder and Phenyl Ether Oligomer:

0.7789 g of the Diels Alder oligomer and 1.1445 g a phenyl ether oligomer end capped with active fluorine group is added to a 100 ml round bottom flask with 5 ml of DMaC. 0.015 g of K$_2$CO$_3$ are added to the flask and stirred at 100° C. for 48 hrs.

The reaction is then quenched in 500 ml of 0.05 M HCl, the solid is then rinsed several times and dried in a vacuum over for 24 hrs.

Sulfonating the Block Co-Polymer:

1 g of the block co-polymer was dissolved in 10 ml of CH$_2$Cl$_2$ and stirred for 3 hrs. The solution was cooled in a acetonititrile/dry ice bath and 5 ml of chlorosulfonic acid was added dropwise. After stirred for 1 hr the reaction was warmed to room temperature and a dark solid precipitate from solution. The solid was collected and rinsed several times with water. It was then soaked in a 1.0M sodium hydroxide solution for 12 hrs and then rinsed several times before drying in a vacuum.

The invention claimed is:

1. A method of synthesizing a multi-block sulfonated Diels Alder poly(phenylene) copolymer, comprising, in the order listed:
    a) synthesizing an end-capped, controlled molecular weight DAPP oligomer, having a known repeat unit length=$\bar{n}$ wherein the end-capping step comprising using an end-cap monomer selected from the group consisting of 3-ethynylanisole, 4-ethynylanisole, 2-ethynylanisole, ethynyl ethoxybenzene, and ethynyl isopropoxybenzene;
    b) converting the end-cap groups to a reactive functional group;
    c) linking the DAPP oligomer with a second polymer segment having m repeat units, to make a multi-block copolymer having n and m repeat units; and
    d) sulfonating the multi-block copolymer by attaching acid groups onto only the DAPP repeat units, thereby producing a multi-block sulfonated Diels Alder poly(phenylene) copolymer having both hydrophobic and hydrophilic segments.

2. The method of claim 1, wherein synthesizing the end-capped DAPP oligomers in step a) comprises combining 1,4-bis(2,4,5-triphenylcyclopentadienone)-benzene and 1,4-diethynylbenzene with 3-ethynylanisole, which generates methoxy end-cap groups.

3. The method of claim 2, wherein step a) comprises performing the following reaction:

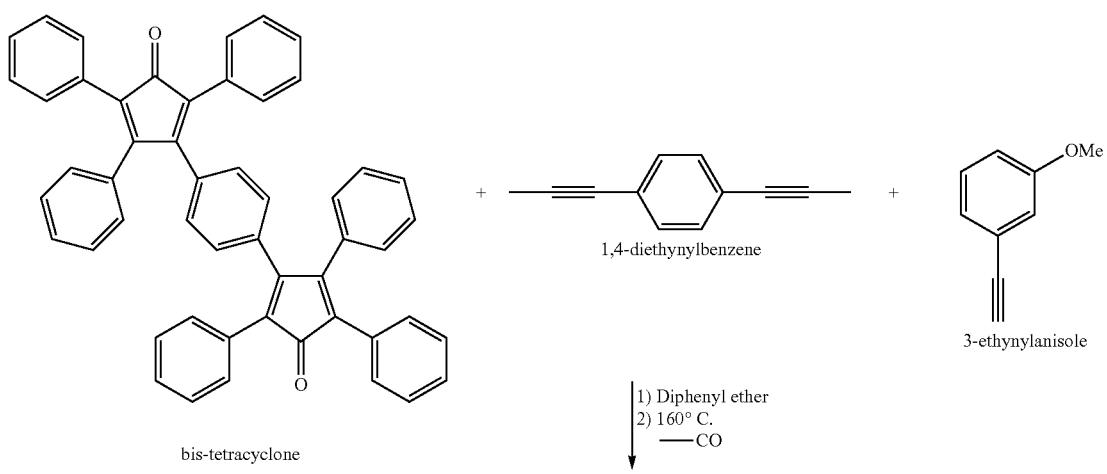

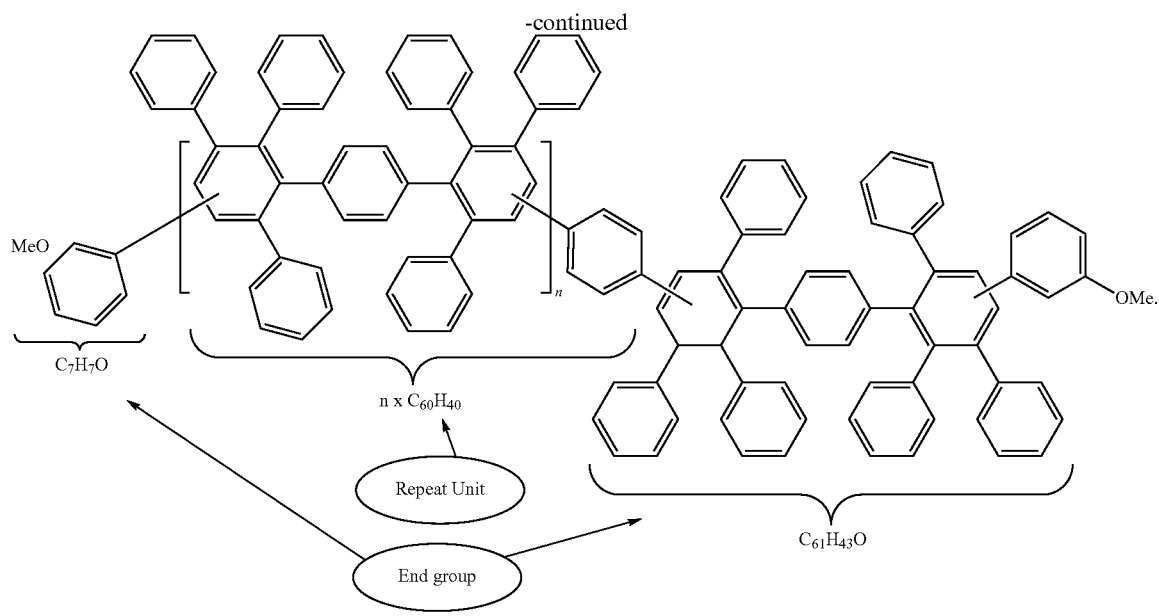
4. The method of claim 1, further comprising determining the repeat unit size, n, by doing end-cap group NMR signature analysis.
5. The method of claim 3, wherein step b) comprises performing the following reaction, which converts the methoxy end-cap groups to a reactive hydroxyl functional group:
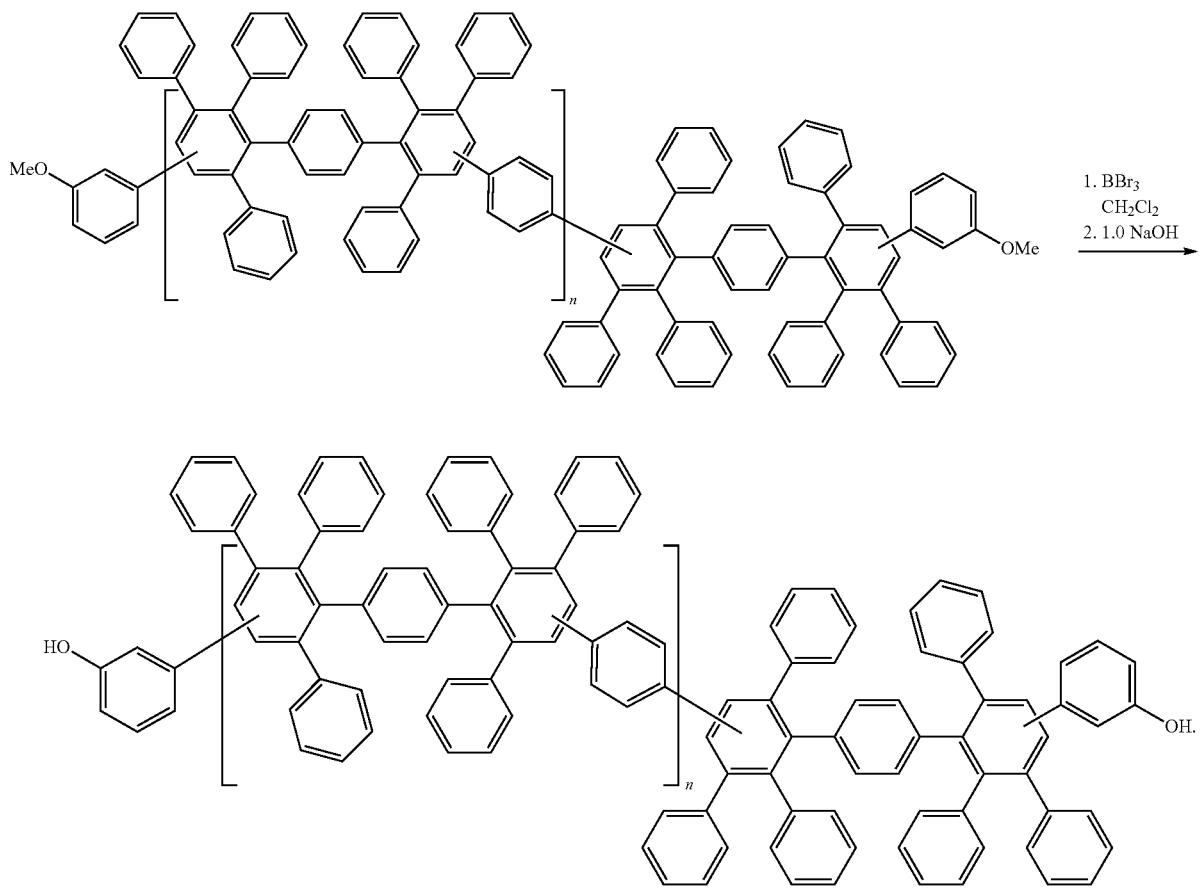

6. The method of claim 1, wherein the second polymer is an activated oligomer that has endgroups that are susceptible to nucleophilic aromatic substitution reactions; and wherein the second polymer is selected from the group consisting of fluorinated poly(arylene ether) polymer with reactive aryl-F bonds, p-halophenyl sulfone, p-halophenyl ketone, ethynyl tetrafluorobenzene, and pentafluorobenzene.

7. The method of claim 6, wherein the second polymer is a fluorinated poly(arylene ether) polymer with reactive aryl-F bonds.

8. The method of claim 7, wherein step c) comprises performing the following reaction:

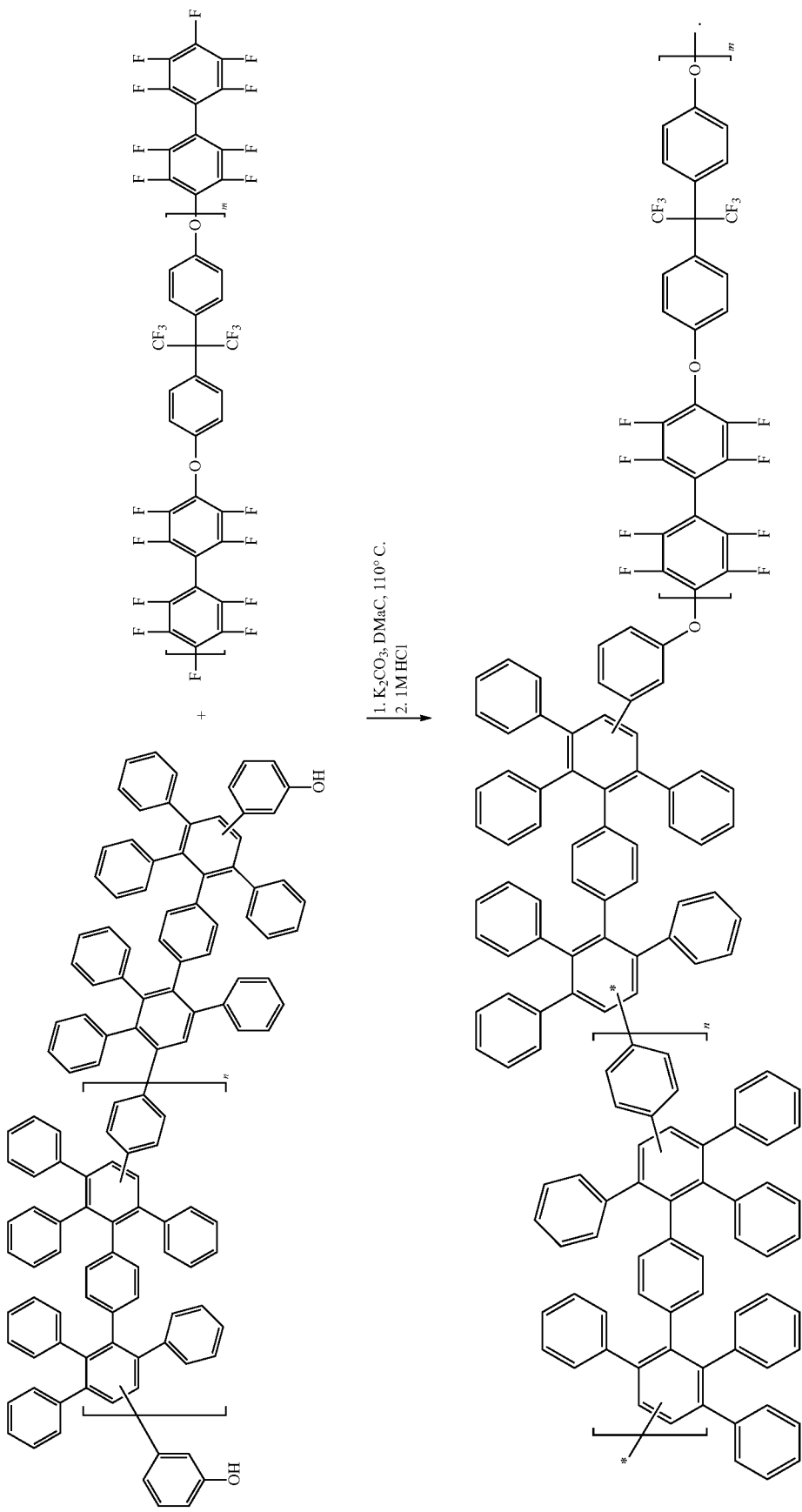

9. The method of claim 1, wherein sulfonating the multi-block copolymer in step d) comprises exposing the multi-block copolymer to a sulfonating agent selected from the group consisting of sulfuric acid, fuming sulfuric acid, sulfur trioxide, a mixture of sulfuric acid and thionyl chloride, chlorosulfonic acid, and trimethylsilyl chlorosulfonate (TMSCS).

10. The method of claim 9, wherein sulfonating in step d) is done by adding the multi-block copolymer to the sulfonating agent, either neat or mixed with a chlorinated hydrocarbon.

11. The method of claim 8, wherein step d) comprises performing the following sulfonation reaction:

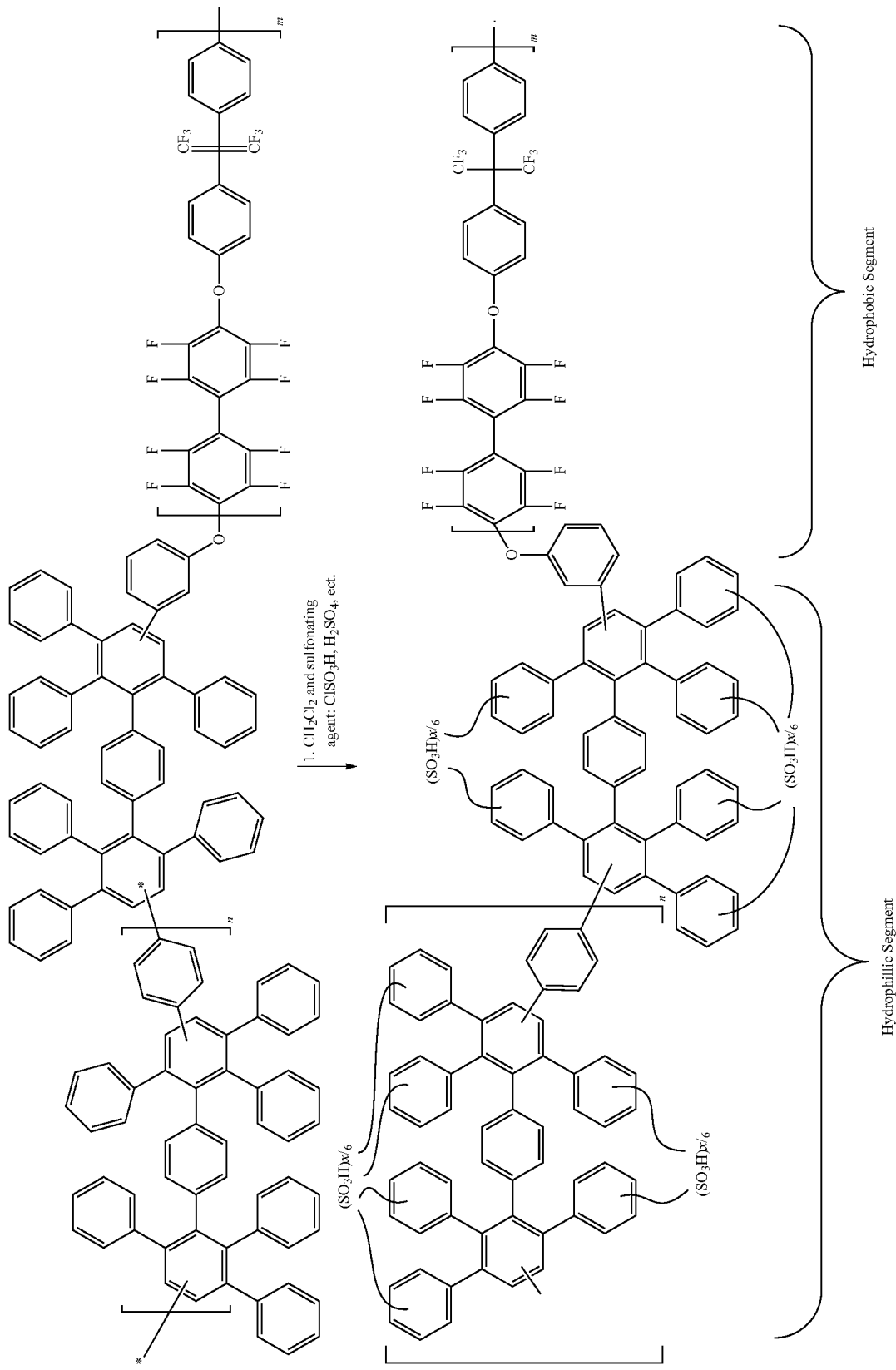

12. A multi-block sulfonated Diels Alder poly(phenylene) copolymer, comprising a sulfonated DAPP segment having a repeat unit size=n, which is linked to a non-sulfonated fluorinated poly(arylene ether) polymer segment having a repeat unit size=m; wherein the copolymer has the following structure:

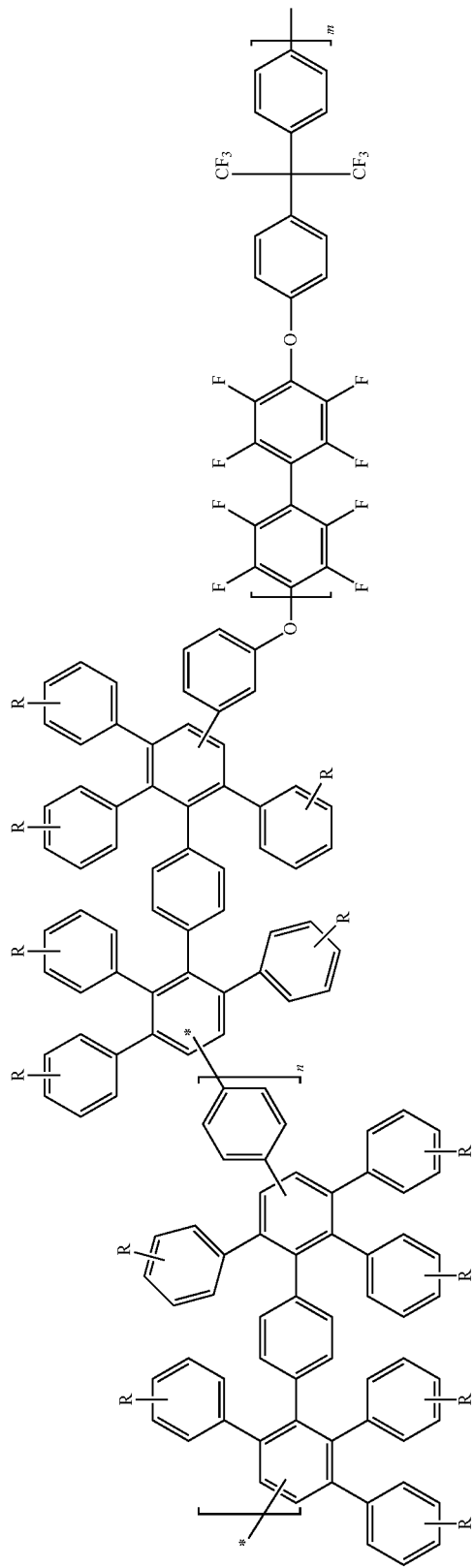

wherein R represents a hydrogen atom or a SO₃H group.

13. The copolymer of claim 12, wherein the number of sulfonic acid groups per poly(phenylene) repeat unit ranges from 1 to 6.

14. The copolymer of claim 12, wherein the number of poly(phenylene) repeat units, n, ranges from 1 to 300.

15. The copolymer of claim 12, wherein the number of poly(phenylene) repeat units, n, ranges from 1 to 50.

16. The copolymer of claim 12, wherein the number of poly(ether) repeat units, m, ranges 1 to 50.

17. The copolymer of claim 12, wherein the ratio of the sizes of the two different polymer repeat units, n and m, ranges according to $0.1\ m \leq n \leq 100\ m$.

18. The copolymer of claim 12, wherein the copolymer has a proton conductivity from 63 to 183 mS/cm in liquid water at 30° C.

19. The copolymer of claim 12, wherein the sulfonated DAPP segment is hydrophillic, and the fluorinated poly(arylene ether) polymer segment is hydrophobic.

20. The copolymer of claim 12, wherein the number of sulfonic acid groups per poly(phenylene) repeat unit is 6.

21. A method of synthesizing a multi-block sulfonated Diels Alder poly(phenylene) copolymer, comprising performing the following four-step reaction:

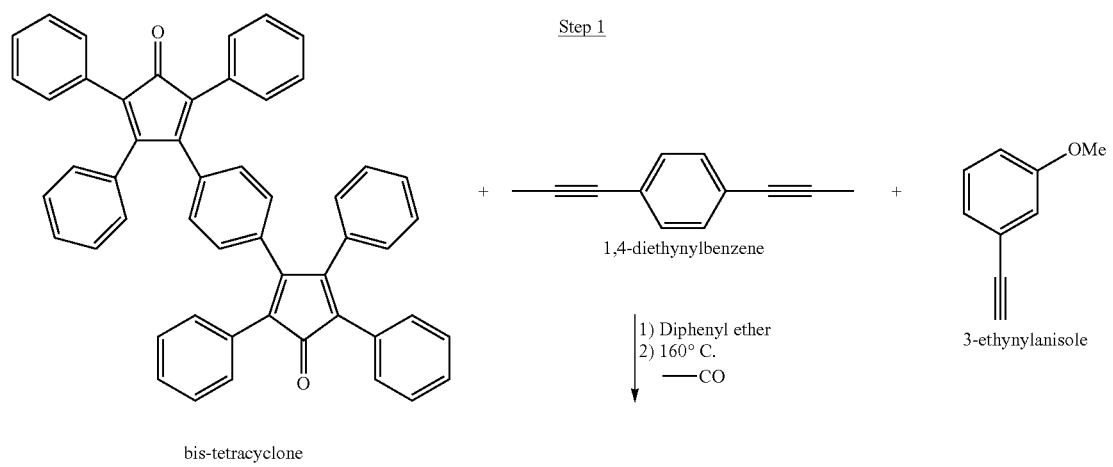

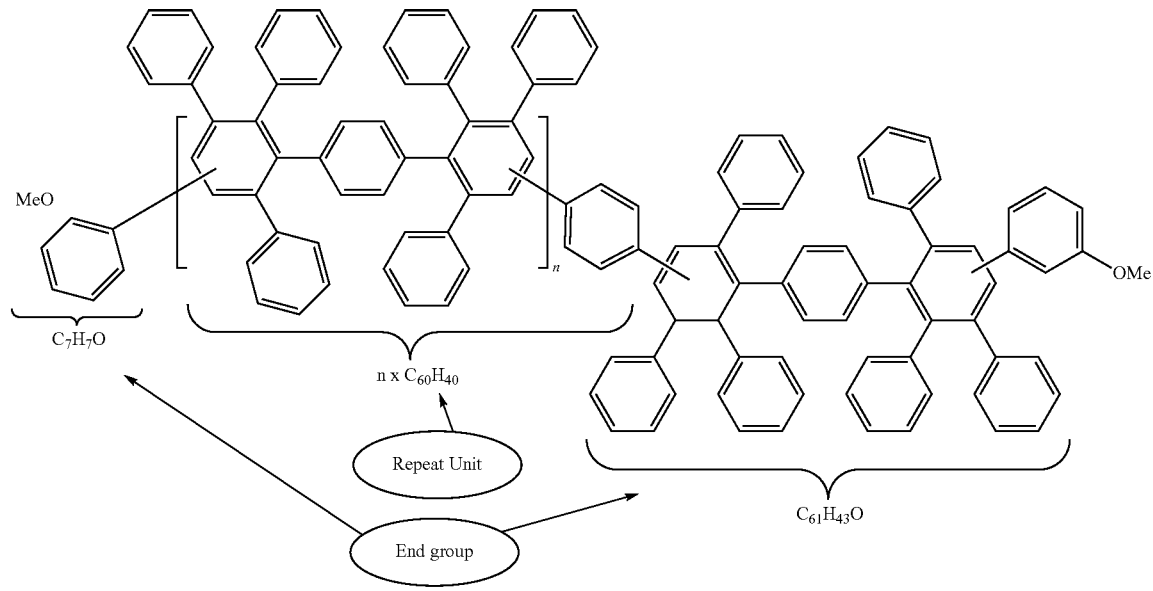

-continued
Step 2
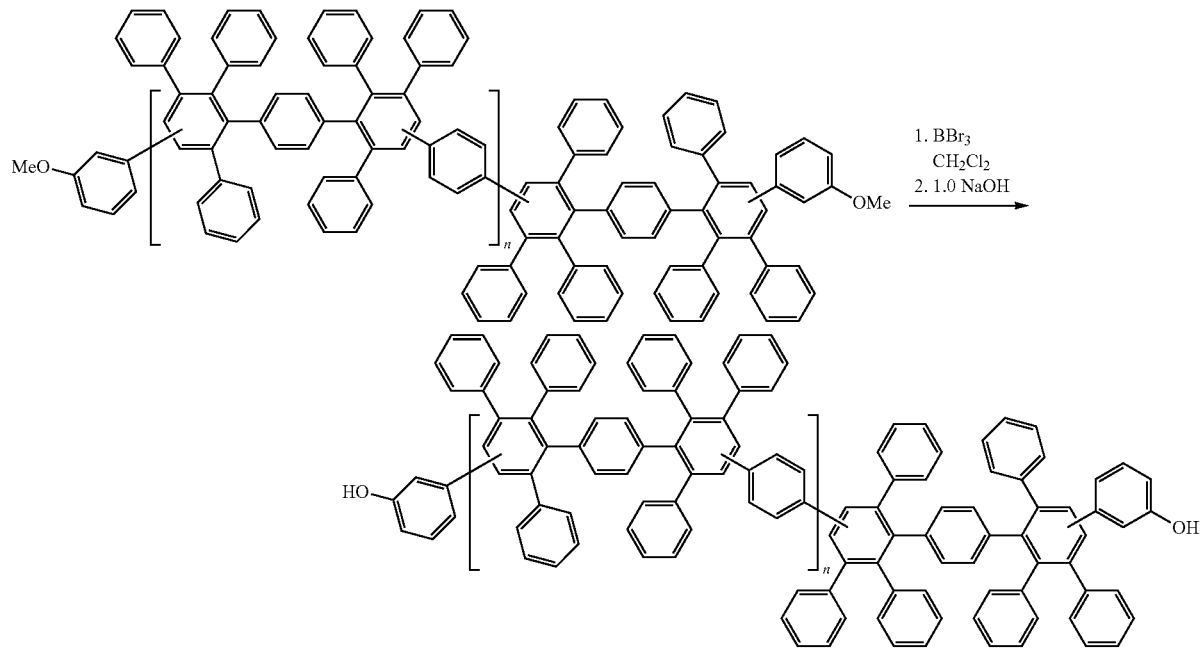
Step 3
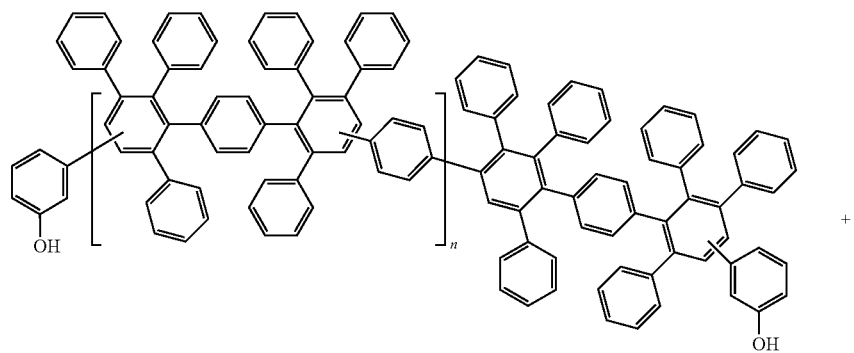
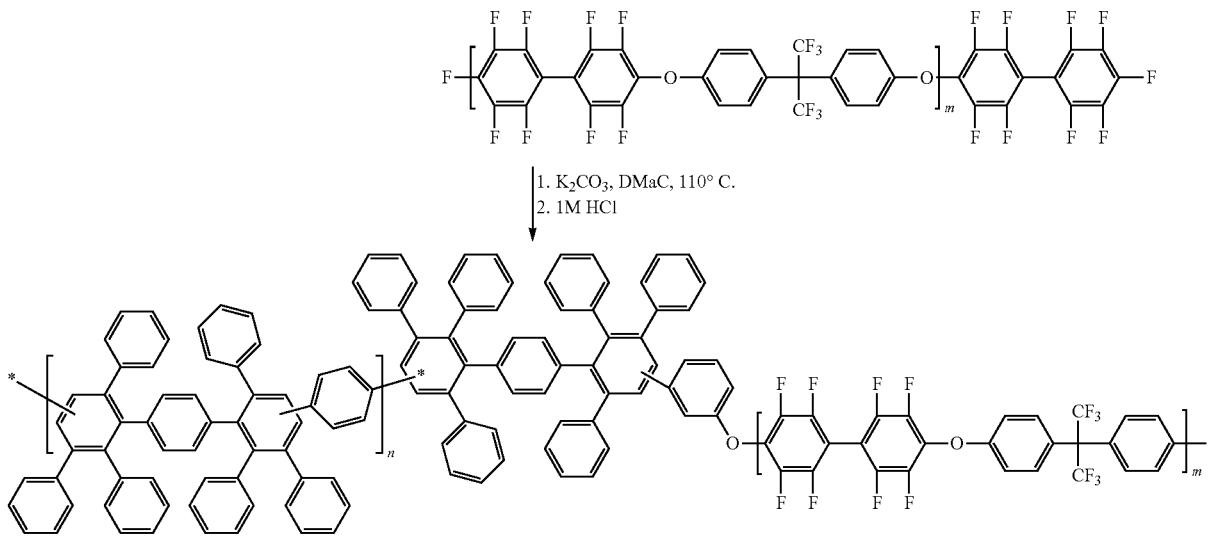

-continued
Step 4
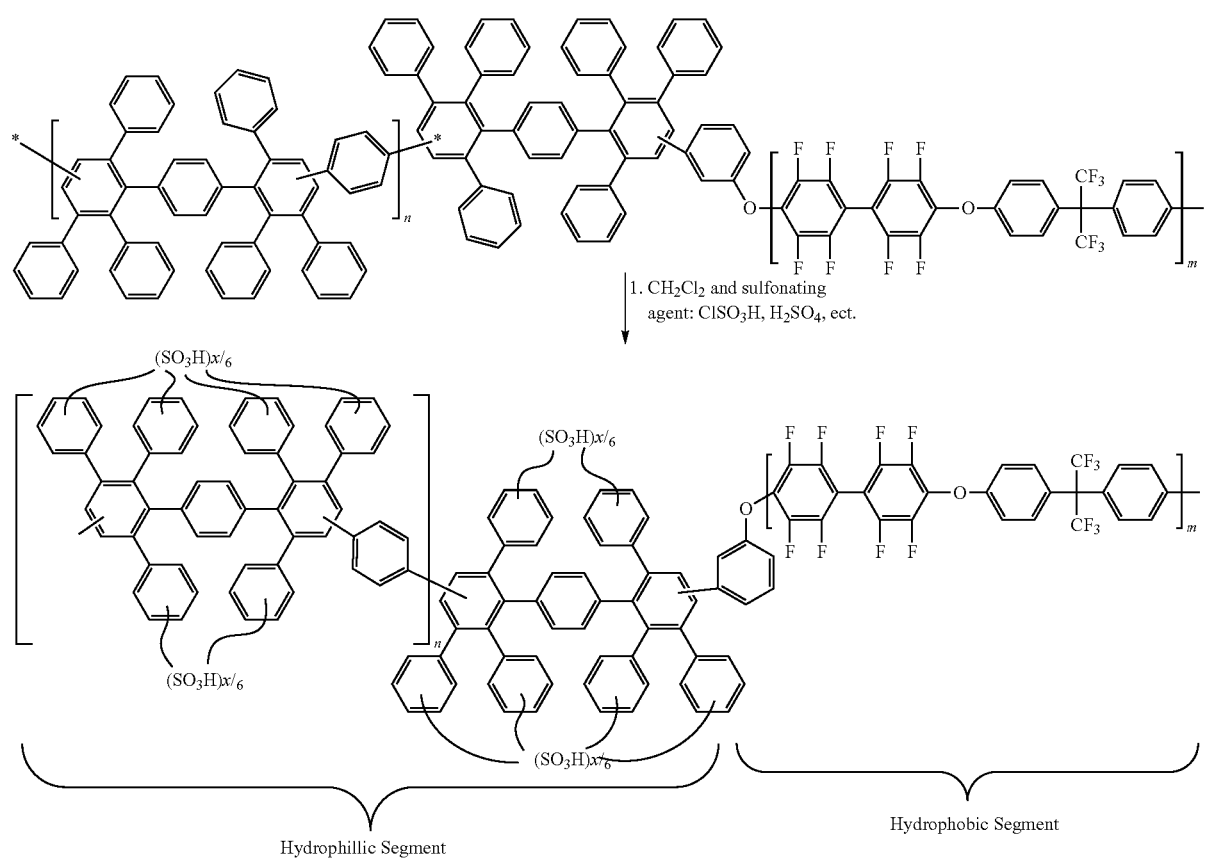
* * * * *